US005686899A

United States Patent [19]

Hosmer

[11] Patent Number: 5,686,899

[45] Date of Patent: Nov. 11, 1997

[54] TRUCK VAN DOOR LOCK

[76] Inventor: William F. Hosmer, 221 Edgegrove Ave., Staten Island, N.Y. 10312

[21] Appl. No.: 382,678

[22] Filed: Feb. 2, 1995

[51] Int. Cl.[6] .......... H04Q 1/00

[52] U.S. Cl. .......... 340/825.31; 340/825.69; 70/278

[58] Field of Search .......... 340/825.31, 825.54, 340/825.69, 825.72; 70/278; 292/60

[56] References Cited

U.S. PATENT DOCUMENTS

| | | | |
|---|---|---|---|
| 3,836,186 | 9/1974 | Kennedy . | |
| 4,286,305 | 8/1981 | Pilat | 70/278 |
| 4,815,773 | 3/1989 | Merrell | 292/60 |
| 5,003,800 | 4/1991 | Bublewizc | 70/278 |
| 5,062,669 | 11/1991 | McManigal | 292/60 |
| 5,109,221 | 4/1992 | Lambropoulos | 340/825.69 |
| 5,263,347 | 11/1993 | Allbaugh | 70/278 |
| 5,487,290 | 1/1996 | Miller | 70/278 |

*Primary Examiner*—Brian Zimmerman

[57] ABSTRACT

A truck van door lock wherein a lock assembly includes a lock housing having a solenoid to selectively project a locking bolt from the lock housing, with the locking bolt arranged for reception within a bolt receiving cavity of an adjacent latch housing, and the lock housing and the latch housing positioned to interior surfaces of truck van doors, and a switch member remotely oriented in electrical communication relative to the lock housing, and the switch housing having a switch member therewithin arranged for selective closure upon magnetically directing a permanent magnet in adjacency to the switch housing to effect engagement of a first filament and a second filament within the switch housing, such that a receiver signal will be received by the lock housing to effect selective projection or retraction of the solenoid locking bolt relative to the lock housing.

5 Claims, 3 Drawing Sheets

TRUCK VAN DOOR LOCK

TECHNICAL FIELD

A truck door lock is arranged to include a lock housing and a bolt receiving housing, each arranged for fixed securement to truck van doors in a facing relationship relative to a cavity of the truck van to thereby prevent tampering of the lock assembly by unauthorized individuals.

BACKGROUND OF THE INVENTION

Prior art locking structure has been employed relative to latching arrangements such as exemplified by the U.S. Pat. Nos. 3,836,186; 4,815,773; 5,003,800; 5,062,669; and 5,263,347.

Typically, mechanisms of this type are positioned to an exterior surface of cooperating door structure of a truck, as opposed to the instant invention which renders such access unavailable from unauthorized individuals.

SUMMARY OF THE INVENTION

The truck van door lock of the invention comprises a lock housing cooperative with a latch housing, each secured to an interior surface of cooperating doors of a truck van, such that a transmitter employs a magnet arranged to close a remote switch member permitting the transmitter to effect actuation of a solenoid and project a locking bolt from the lock housing into reception of a bolt receiving cavity of the associated latch housing.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
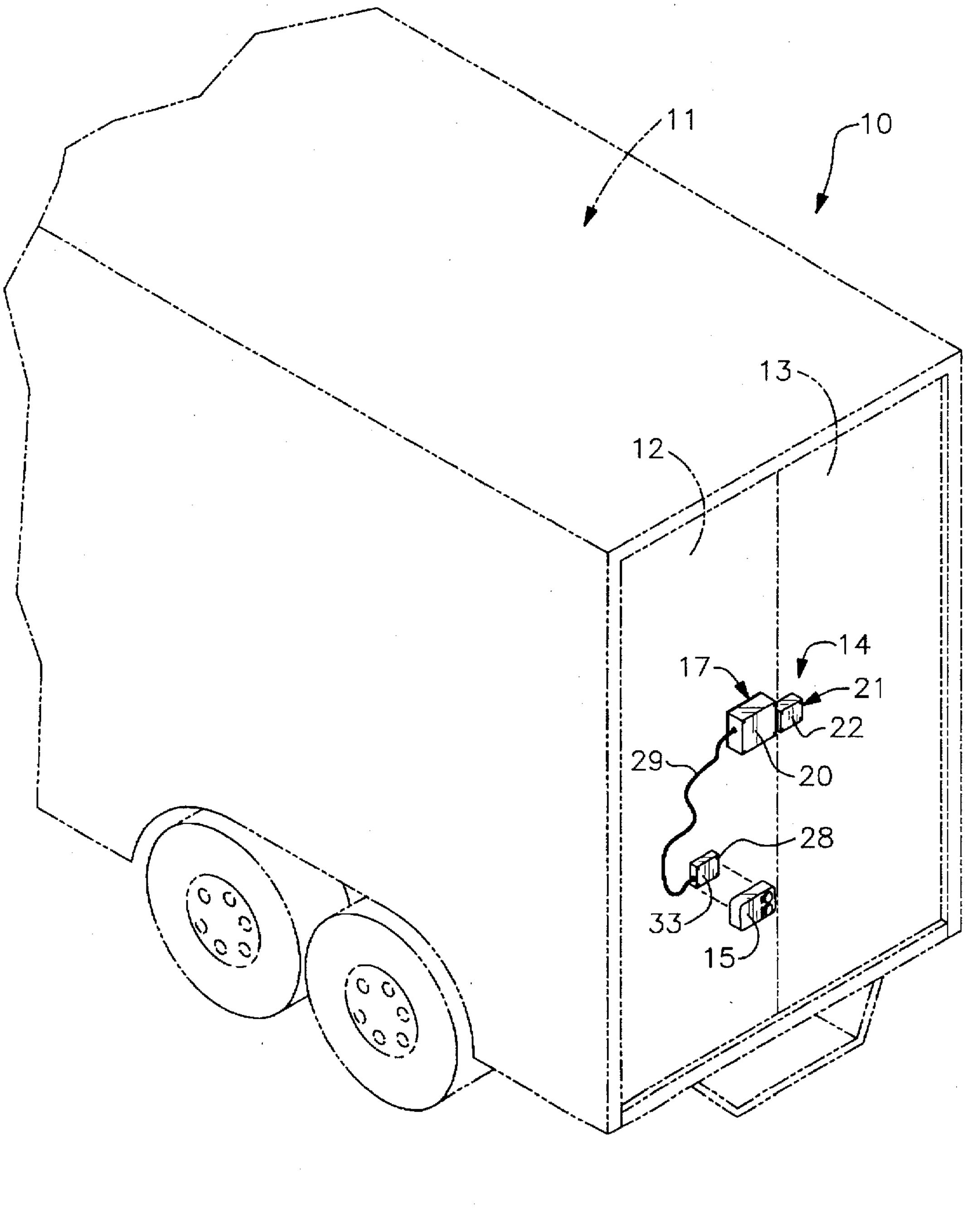
FIG. 1 is an isometric illustration of the invention secured relative to an interior surface of cooperating truck van doors.
Figure 2:
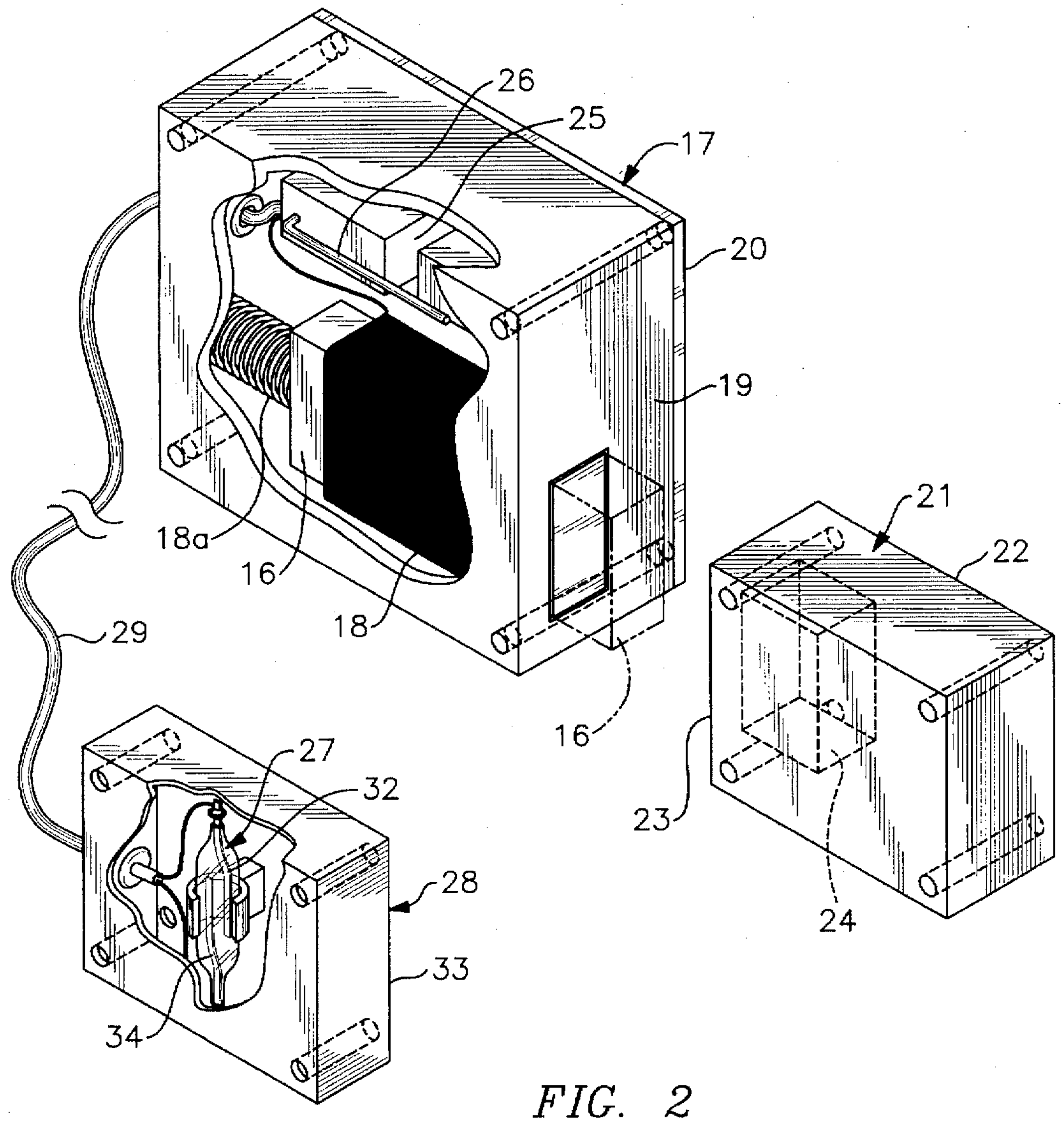
FIG. 2 is an isometric illustration of the lock housing, latch housing, and switch housing arranged for securement within the van.
Figure 3:
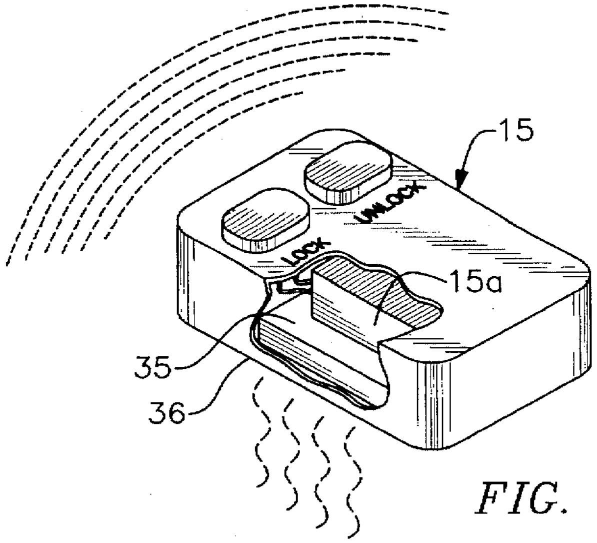
FIG. 3 is a perspective illustration of the transmitter in partially broken-away section, to indicate various components therewithin.
Figure 4:
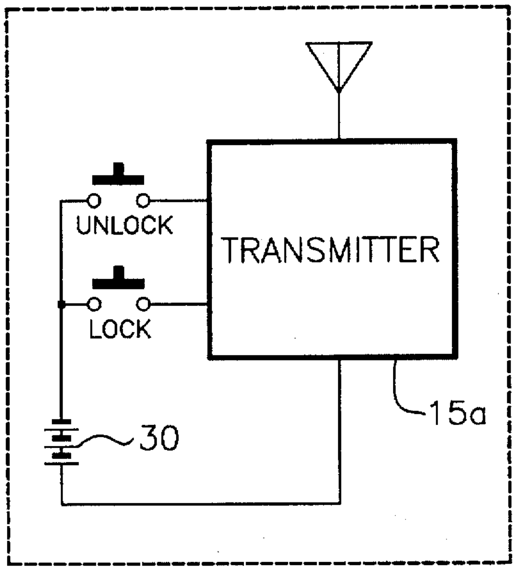
FIG. 4 is a diagrammatic illustration of the transmitter circuitry.
Figure 5:
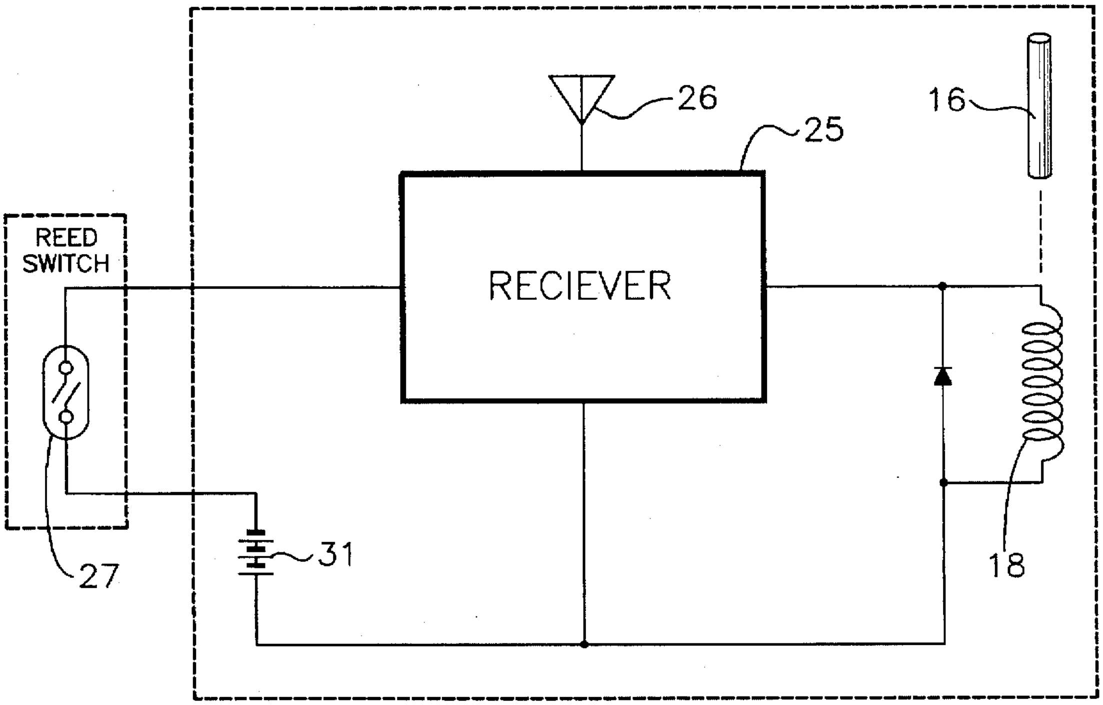
FIG. 5 is a diagrammatic illustration of the receiver circuitry in its cooperation relative to the switch housing and solenoid structure.

The truck van door lock 10 of the invention comprises the use of a truck van housing 11 including a top wall, a bottom wall, spaced side walls, with entrance into an enclosed cavity of the truck van accessed through respective first and second truck doors 12 and 13 respectively that are respectively hingedly and typically secured to opposed side walls of the truck van housing. The lock assembly 14 of the invention includes a lock housing 17 cooperative with a latch housing 21 that are each secured to an interior surface of each of the doors 12 and 13 preventing access to such structure from exteriorly of the truck van housing when the doors are in a latched configuration, such as illustrated in FIG. 1. To this end, operation of the lock assembly 14 is effected through a transmitter housing 15 (see FIG. 3) utilizing a plurality of signals to include a "lock signal" or "unlock signal" effecting selective projection and reciprocation of an associated locking bolt 16 relative to the lock housing 17. The locking bolt 16 is reciprocatably operative through a solenoid structure 18, with the locking bolt 16 functioning as a solenoid piston, with the use of a solenoid spring **18*a* of the solenoid 18 arranged to maintain the locking bolt 16 in a projected orientation relative to a locking housing forward end wall 19. The locking housing having a locking housing rear wall 20 is arranged for securement to the first truck door 12 interiorly of the truck van housing. The latch housing 21 includes a latch housing rear wall 22 arranged for fixed securement to the interior of the surface of the second door 13 within the truck van housing 11 and to this end, the latch housing includes a latch housing forward end wall 23 having a bolt receiving cavity 24 directed therethrough, with the bolt receiving cavity 24 positioned within the latch housing 21 to receive the locking bolt 16 when in the projected orientation, such as illustrated in FIG. 2. A receiver unit 25 is positioned within the lock housing 17 to receive signals from the transmitter 15*a* within the transmitter housing 15 by way of a receiving unit antenna 26, such as indicated, directing operation of the solenoid 18 to either project or retract that solenoid locking bolt 16 relative to the "lock" or "unlock" actuation of the transmitter housing 15. A magnetic switch 27 is provided typified as a "reed switch" secured to the first truck door 12, with the magnetic switch 27 remotely oriented relative to the lock housing 17 in electrical communication therewith through a connecting electrical cable 29. The switch housing 28 includes the magnetic switch 27 having first and second filaments 32 and 34 respectively facing one another, having an air gap therebetween in an integral position, with the transmitter housing 15 having a transmitter housing bottom wall 36, wherein a permanent magnet 35 is secured within the transmitter housing 15 to the transmitter housing bottom wall 36. Positioning of the transmitter housing bottom wall 36 onto the first truck door 12 in a position to the switch housing rear wall 33 attracts the first filament 32 to the second filament 34 completing circuitry to permit the solenoid 18 to actuate by use of transmitting a lock or unlock signal to the receiver unit 25. The switch housing 28 is spaced from the lock housing 17 to prevent magnetic inductive interference when the permanent magnet 35 is positioned in adjacency to the magnetic switch 27. It should be further noted that the permanent magnet 35 is of sufficient strength to permit the first and second filaments 32 and 34 to contact one another and to this end, it is preferred that the transmitter housing bottom wall 36** be of material such as non-ferrous material, of thickness and the like to minimize interference of the permanent magnet structure relative to the effecting contacts of the first and second filaments in engagement relative to one another.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by Letters Patent of the United States is as follows:

1. A truck van door lock, comprising, a lock housing mounted on a first interior surface of a first truck van door, the lock housing including a lock housing front wall spaced from a lock housing rear wall, and a lock housing forward end wall, the lock housing having a solenoid contained therewithin, and a receiver means within the lock housing arranged to effect selective activation of the solenoid, with the solenoid including a locking bolt, the locking bolt arranged to project through the lock housing forward end wall upon the receiving means receiving a first signal, and a transmitter housing, the transmitter housing having a transmitter therewithin, the transmitter arranged to effect a first signal and a second signal, with the first signal arranged to project the locking bolt through the lock housing forward end wall, and the second signal arranged to effect retraction of the locking bolt within the lock housing, and a switch housing mounted on the first interior surface of the first truck van door, the switch housing being in electrical communication with the lock housing and the transmitter, with the switch housing having a switch member therewithin, with the transmitter housing having magnetic means for effecting closure of the switch, and wherein the switch housing is spaced from the lock housing by a distance sufficient to prevent magnetic interference with the lock housing when the transmitter magnetic means is positioned adjacent to the switch housing.

2. A truck van door lock as set forth in claim 1 wherein the magnetic means includes a permanent magnet, and the transmitter housing having transmitter housing top wall spaced from a transmitter housing bottom wall, and the permanent magnet positioned in adjacency to the transmitter housing bottom wall, and the transmitter housing bottom wall arranged for positioning in adjacency to the switch for effecting closure of the switch.

3. A truck van door lock as set forth in claim 2 wherein the switch includes a first filament spaced from a second filament, and the first filament arranged to engage the second filament upon orientation of the permanent magnet in adjacency to the switch.

4. A truck van door lock as set forth in claim 1 further including a truck van housing, with the truck van housing having a van housing top wall spaced from a van housing bottom wall and spaced van housing side walls, with the first truck van door and a second truck van door pivotally mounted to opposed side walls of said side walls, the second truck van door having a second interior surface wherein the first and second surfaces are arranged in facing relationship to an interior cavity of the truck van housing when the first and second truck van doors are in an interlocked relationship relative to one another.

5. A truck van door lock as set forth in claim 1 further including a latch housing, a cavity extending into the latch housing for receiving the locking bolt therein, the latch housing mounted on a second interior surface of a second truck van door in spaced relationship relative to the lock housing, wherein the lock housing, latch housing, locking bolt, and cavity are in alignment when the first and second truck van doors are in a closed position.

* * * * *